United States Patent
Dadebo et al.

(10) Patent No.: US 7,292,899 B2
(45) Date of Patent: Nov. 6, 2007

(54) MODEL PREDICTIVE CONTROL HAVING APPLICATION TO DISTILLATION

(75) Inventors: Solomon A. Dadebo, Williamsville, NY (US); Thomas Craig Hanson, Buffalo, NY (US); Frank J. Klein, III, Baton Rouge, LA (US)

(73) Assignee: Praxair Technology, Inc., Danbury, CT (US)

( * ) Notice: Subject to any disclaimer, the term of this patent is extended or adjusted under 35 U.S.C. 154(b) by 283 days.

(21) Appl. No.: 11/203,140

(22) Filed: Aug. 15, 2005

(65) Prior Publication Data

US 2007/0038333 A1    Feb. 15, 2007

(51) Int. Cl.
  *G05B 13/02*   (2006.01)
  *G06F 17/50*   (2006.01)
  *G06F 17/10*   (2006.01)
  *G06F 7/48*    (2006.01)
  *F25J 3/00*    (2006.01)

(52) U.S. Cl. .................... 700/29; 703/1; 703/2; 703/6; 62/643

(58) Field of Classification Search ................ 700/29; 62/643
  See application file for complete search history.

(56) References Cited

U.S. PATENT DOCUMENTS 3,334,966 A * 8/1967 Shepherd et al. ............ 423/294
4,102,659 A   7/1978 Martin
6,727,747 B2  4/2004 Tani et al.
7,194,318 B2 * 3/2007 Attarwala ..................... 700/29

OTHER PUBLICATIONS

Bequette-W., "Process Control" Apr. 2003, p. i,246-263,703-705,707,708,711-716,720.*

* cited by examiner

*Primary Examiner*—Anthony Knight
*Assistant Examiner*—Tom Stevens
(74) *Attorney, Agent, or Firm*—David M. Rosenblum

(57) ABSTRACT

A method of controlling a distillation column having control valves to control both reflux and the vapor rate within the column. In accordance with the present invention, a temperature sensed in a top section of the column is magnified and utilized within the model predictive controller so that control is more aggressive as temperatures increase beyond a threshold temperature. Additionally, in the distillation column, or in fact in any other system in which two or more manipulated variables control two or more common controlled variables, special modeling techniques are utilized to make controller tuning easier to accomplish. In such modeling techniques, each manipulated variable is assumed to be able to have an effect on a controlled variable by a single step response model and other step response models are utilized so that the other manipulated variable(s) that also would have an effect on the same controlled variable are taken into account by the controller as feed forward variables.

7 Claims, 4 Drawing Sheets

MODEL PREDICTIVE CONTROL HAVING APPLICATION TO DISTILLATION

FIELD OF THE INVENTION

The present invention relates to a method of controlling a distillation column or other system by model predictive control. More particularly, the present invention relates to such a method in which temperatures in a top section of the distillation column, as utilized by the controller, are transformed to obtain more aggressive manipulation of reflux addition in columns having instability due to multiple steady-state temperature profiles. Additionally, the present invention relates to such a method that also has application systems other than distillation columns in which certain manipulated variables are utilized within the controller as feed forward variables to allow for simplified controller tuning.

BACKGROUND OF THE INVENTION

Model predictive control systems known as "MPC" are utilized to control a variety of industrial processes. Generally speaking, model predictive controllers operate on independent and dependent variables. Independent variables are manipulated variables that can be changed or moved by an operator or controller, such as settings of valve positions or setpoints for (flows, temperatures, pressures, etc.) and feed forward or disturbance variables that have a significant impact on the process or system to be controlled yet cannot be directly manipulated. Dependent variables are controlled variables having a value that can be described or predicted totally in terms of specific independent variable changes.

A model predictive controller is programmed with step response models that show how each controlled variable responds to a change in a given independent variable. These models are used to predict the future behavior of the controlled variables based on past history of the controlled, manipulated and feed forward variables. The prediction is used to calculate appropriate control actions for the manipulated variables. The model predictions are continuously updated with measured information from the process to provide a feedback mechanism for the model predictive controller.

The models that operate the model predictive controller consist of a collection of step response models that relate the controlled variables to the manipulated and feed forward variables on the basis of a unit move of the manipulated or feed forward variables and the time after such move it takes the controlled variables to reach steady state. During operation of a controller, data is maintained that records prior values of the manipulated variables, predicted values of the controlled variables and actual values of the controlled variables. The data is updated upon every execution of the controller and is used to determine a prediction error that can be applied to the model prediction as feedback to the controller.

Utilizing the current values of the manipulated variables, an open loop response is determined, that is a response that would be obtained over a prediction horizon had no further control inputs been entered. Thereafter, a set of optimized moves of the manipulated variable are predicted to obtain a closed loop response that will bring the controlled variables to target values which in practice are set within ranges. The first of the controller moves contained within the movement plan is then transmitted to local controllers that function to control equipment within the system such as flow controllers. Such local controllers can be proportional integral differential controllers that are used, for example, to control valve actuators. The foregoing process is repeated during each execution of the controller.

Model predictive control systems have been used to control air separation plants having distillation columns. In a distillation column, a multicomponent feed to be separated or fractionated is introduced into a distillation column under conditions in which an ascending vapor phase of the mixture to be separated contacts a descending phase thereof in such a manner that the vapor phase, as it ascends, become evermore rich in the light or more volatile components of the mixture and the liquid phase, as it descends, becomes evermore rich in the heavier or less volatile components of the mixture. This contact is provided by mass transfer elements that can be structured or random packing or sieve trays.

Certain types of distillation columns are designed to produce high purity and ultra high purity products, that is products having a purity of greater than approximately 99.99% percent by volume. Such columns are particularly sensitive to the liquid/vapor ratio and can exhibit multiple steady-state temperature profiles that will rapidly change from one profile to another profile based upon the amount of vapor rising in the column and the amount of heat introduced into the column. As a result, during an upset condition caused by a change in feed composition, it can be difficult, to control the liquid to vapor ratio within the column and therefore the product purity.

Another more general problem of control is that model predictive controllers can be very difficult to tune when used in connection with certain types of systems that can include distillation columns. The difficulty arises in multivariable systems in which movement of each of two or more manipulated variables effect the value of two or more common controlled variables. For instance, in the distillation column case, a reflux flow control valve position can be represented within a model predictive control system as one manipulated variable that will have an effect on the temperature in the top section of a column as well as the bottom section of the column. Generally speaking, adding reflux tends to cool the entire column. The vapor rate within the distillation column can be controlled by a valve that controls the amount of vapor within the feed to the column. The same valve can be said to control heat addition since the vapor fraction in such a system can be controlled by controlling the amount of liquid vaporized. The position of such valve can be represented in the model predictive controller by another manipulated variable that will also have an effect on both the temperature in both the top and bottom sections of the distillation column. Under such circumstances, tuning of the controller becomes a time consuming and difficult proposition.

As will be discussed, the present invention, in one aspect, relates to a method of controlling a distillation column by model predictive control in which the controller is able to react more aggressively at certain temperature levels to prevent the product from deviating from the required product purity. In another aspect, the step response models are more effectively utilized to allow the controller to be more easily tuned.

SUMMARY OF THE INVENTION

The present invention provides a method of controlling a distillation column having control valves including a reflux flow control valve to manipulate reflux flow rate to a top section of the column and at least one inlet for a feed to be separated that is situated below a reflux inlet for the reflux flow. The feed has a varying temperature that could potentially have an effect on a first temperature sensed within the top section of the distillation column upon an increase in feed temperature and a varying composition that could also potentially have an effect on the first temperature upon an increase in the less volatile components within the feed.

In accordance with the method, a model predictive controller is repeatedly executed at a controller frequency. The model predictive controller has a dataset, containing records over a previous time period equal to a prediction horizon, that include valve positions of the control valves, including the reflux flow control valve, as manipulated variables. The dataset also contains corresponding actual values of sensed temperatures, including the first temperature, as controlled variables and predicted values for the controlled variables that were predicted by the model predictive controller. The model predictive controller is also programmed with step response models relating the manipulated variables to the controlled variables.

During each execution of the model predictive controller, the dataset is updated with the actual, current values of the manipulated variables and the dataset is utilized along with step response models to calculate prediction errors (or offsets). The prediction errors are applied to the predictions as an off-set and open and closed loop predictions are calculated over the prediction horizon. A set of move plans is thereby obtained for movements of the manipulated variables to minimize the difference between the controlled variables and related target values. Signals are generated that are referable to initial movements contained in the set of move plans. The signals are transmitted to controllers used in setting the control valves, thereby to implement the initial movements of the control valves.

A first of the controlled variables is referable to the first temperature. When the value of the first temperature is below a threshold temperature, the controller operates using the value of the first temperature. When the first temperature is above a threshold temperature, a transformed temperature is utilized by the controller. The transformed value is calculated from a sum of a threshold temperature, a first tuning factor and a temperature change divided by a second tuning factor that is used to amplify the effect of the temperature change. The temperature change is computed by subtracting from current first temperature, the first temperature sensed during a previous execution of the model predictive control program. In such manner, when the temperature rises above a threshold value, the controller, rather than reacting to actual temperature reacts to higher temperature, and provides more aggressive control movements to maintain the product purity.

In a specific case, a second of the controlled variables has a second temperature sensed at the bottom section of the column. The feed is a liquid and is in part vaporized to form a two-phase feed consisting of vapor and liquid fractions. A vaporized column bottom stream, made up of liquid column bottoms, is combined with at least the vaporized fraction of the feed prior to the introduction of the feed into the distillation column and the at least one inlet for the feed is at a column height situated between the top section and bottom section of the distillation column.

The control valves also include a feed flow control valve, as a second manipulated variable, to simultaneously control flow rates of the vapor and liquid fractions such that an increase in the flow rate of the vapor fraction results in a corresponding decrease in the flow rate of the liquid fraction and increases the first temperature and the second temperature and vice-versa. Any increase in the flow rate of the liquid fraction decreases the first overhead temperature and the second temperature and vice-versa. The step response models include first and second step response models relating the first of the manipulated variables to the first and second of the controlled variables. Third and fourth step response models relate the second manipulated variable to the first and second controlled variables, respectively.

As described above, this is a situation in which two manipulated variables effect two common controlled variables resulting in difficulties in tuning the model predictive controller.

The at least one inlet can be two separate inlets. The vapor fraction and the liquid fraction of the feed can be separately introduced into the distillation column through the two separate input inlets. The feed can be divided into first and second subsidiary streams. The first of the subsidiary stream is vaporized to combine with the vaporized liquid column bottoms stream to form a vapor fraction stream. The vapor fraction stream is introduced into one of the two inlets to introduce the vapor fraction into the distillation column. The second subsidiary stream is introduced into the other of the two separate inlets to introduce the liquid fraction into the distillation column stream.

In accordance with a further aspect of the present invention, in case there exists at least two manipulated variables that effect two or more common controlled variables, the open and closed loop predictions may be calculated in accordance with the present invention for the first controlled variables and the first of the manipulated variables through superposition of the first step response model and the third step response model and with the second manipulated variable being used in connection with the third step response model as a first feed forward variable. Open and closed loop predictions are calculated for the second controlled variable through superposition of the fourth step response model and the second step response model and with the first manipulated variable being used in connection with the second step response model as a second feed forward variable. In this case, during any calculation, the position of, for instance, the reflux flow control valve, as far as the controller is concerned, is only dependent upon movement of such valve. Temperature effects of the other feed flow control valve controlling the degree to which the vapor fraction is admitted to the column is taken into account as a feed forward variable in the open and closed loop calculations. Thus, controller tuning becomes an easier matter than prior art tuning situation in which both manipulated variables and both controlled variables have to be considered in the manipulation of a single valve.

This latter aspect of the present invention is applicable to any system having manipulated variables to control process parameters of the system in response to deviation of the process parameters from target values related thereto. It is this feature of the present invention that can be applied to a distillation column and without the temperature transform technique discussed above.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
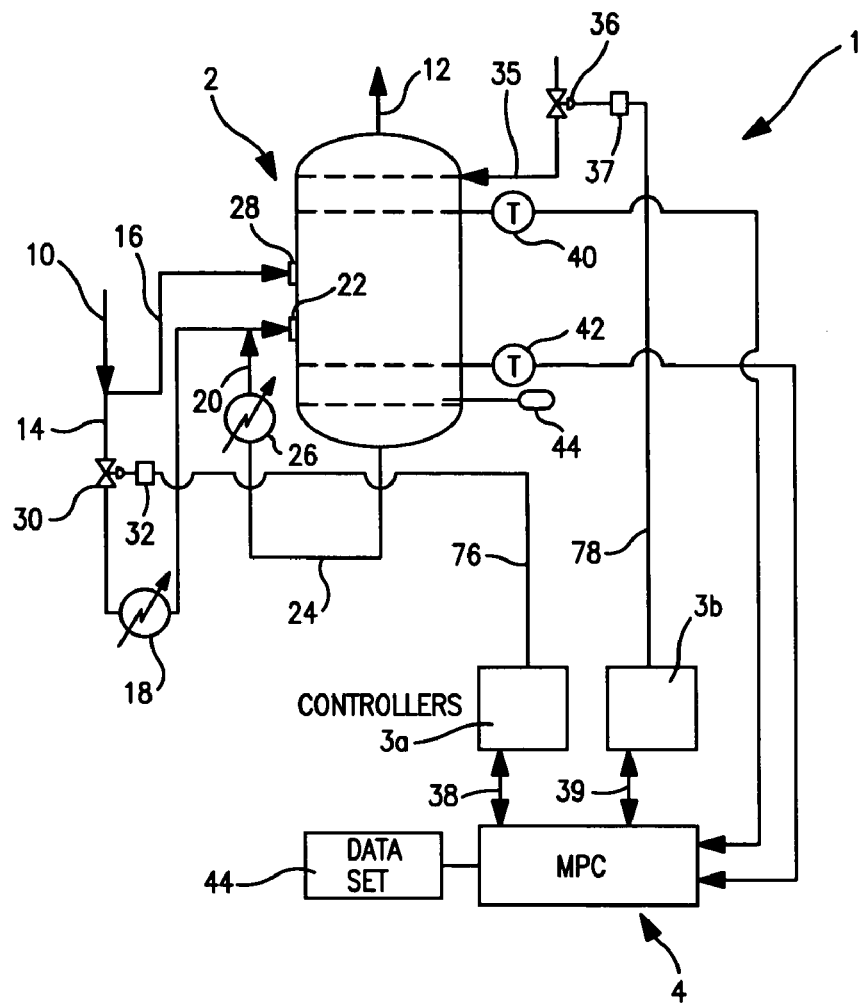
FIG. 1 is a schematic representation of a distillation column and its accompanying control.

With reference to FIG. 1 a distillation column system 1 is illustrated that includes a distillation column 2, valve controllers 3a and 3b and a model predictive controller 4.

Distillation column 2 is designed to receive a liquid feed 10 to separate the components through distillation to produce a purified product 12 as tower overhead. Distillation column 2 consists of mass transfer elements, which in the illustration are sieve trays. The present invention, however, would be applicable to any type of column including that having random or structured packing. In a known manner, an ascending vapor phase of mixture to be separated ascends in column 2 and becomes evermore rich in the more volatile components, referred to in the art as the lighter components. A descending liquid phase contacts the ascending vapor phase through the mass transfer elements and becomes evermore rich in the less volatile components, known as the heavier components, as the liquid phase descends within column 2.

Liquid feed 10 is divided into first and second subsidiary streams 14 and 16. First subsidiary stream 14 is vaporized within a vaporizer or other heat exchange device 18 and is combined with a vaporized liquid column bottom stream 20 and introduced into distillation column inlet 22. A liquid column bottom stream 24 is vaporized within heat exchanger 26 to produce vaporized liquid column bottoms stream 20. Second subsidiary stream 16 is introduced as a liquid into a liquid inlet 28 of distillation column 2.

Thus, in distillation column 2, liquid and vapor fractions of the stream to be separated are separately introduced. It is understood, however, that the aforesaid streams of vapor fraction and liquid fraction could be combined into a two-phase flow prior to entering distillation column 2. A feed flow control valve 30 is provided to simultaneously adjust the amount of liquid and vapor fractions to be introduced into column 2. For instance, as feed flow control valve 30 moves to a closed position, the flow of second subsidiary stream 16 increases to increase the amount of liquid fraction that is introduced into column 2. At the same time the amount of vapor fraction is reduced. A reverse operation occurs as feed flow control valve 30 is opened. Feed flow control valve 30 is controlled by a valve actuator 32 that is linked to a known valve controller 3a, for example a proportional integral differential controller, so that feed flow control valve 32 can be remotely activated.

The descending liquid phase is initiated in column 2 by introducing a reflux stream 35 into a top section of distillation column 2. Reflux stream 35 has the same composition as product stream 12 or can be of even higher purity and thus, can be produced by condensing product stream 12 after having been further purified or without further purification in a reflux condenser, not shown. The flow rate of reflux stream 35 is controlled by a reflux flow control valve 36 having a valve actuator 37 that is linked to valve controller 3b that can be of the same type as valve controller 3a.

The actual control signal inputs 38 and 39 sent to controllers 3a and 3b, respectively, are produced by signals sent by model predictive controller 4 which can be a DMCplus™ controller obtained from Aspen Technology, Inc., Ten Canal Park, Cambridge, Mass. 02141-2201. Control signal inputs 38 and 39 activate controllers 3a and 3b to set the positions of feed flow control valve 30 and reflux flow control valve 36 based upon a first temperature $T_1$ sensed in a top section of the column by temperature sensor 40 and a second temperature $T_2$ sensed in a bottom section of the column 2 by temperature sensor 42. Temperature sensors 40 and 42 are well known devices and can be thermocouples. It is to be noted that the terms "first" and "second" are used simply to facilitate an understanding of the invention by differentiating the actual temperatures sensed. Moreover, as will be discussed, it is also understood that additional temperatures could be sensed as an input to model predictive controller 4.

As can be appreciated by those skilled in the art as the amount of flow in reflux stream 35 increases, the first temperature $T_1$ will decrease and the second temperature $T_2$ will also decrease. As the flow rate of second subsidiary stream 16 increases, the second temperature $T_2$ will decrease. As that temperature decreases, vapor will be condensed and the first temperature $T_1$ will also decrease. By the same token, as the flow rate of the first subsidiary stream 14 increases, the amount of the vapor fraction and therefore heat introduced into column 2 will increase as will the first temperature $T_1$ and more of the liquid column bottoms will also vaporize to increase the second temperature $T_2$.

It is therefore apparent that manipulation of feed flow control valve 30 affects the temperature not only in the top section of the distillation column 2 but also the bottom section of the distillation column 2. The same holds true for manipulation of reflux flow control valve 36.

Figure 2:
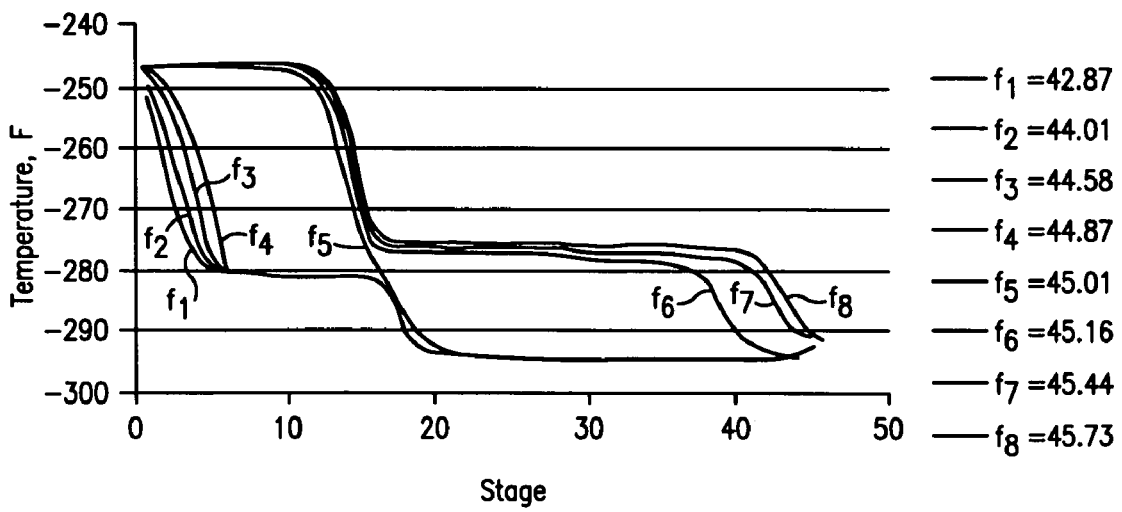
FIG. 2 is a graphical representation of the multiple steady-state temperature profiles of the distillation column illustrated in FIG. 1.

Complicated control problems can arise when a column, such as distillation column 2, has non-linear temperature characteristics and multiple steady state temperature profiles that are greatly affected by the amount of vapor and heat that is introduced into distillation column 2 by manipulation of feed flow control valve 30. For example, with reference to FIG. 2, the non-linear temperature distributions and multiple steady state temperature profiles are graphically depicted for distillation column 2. As can be seen, the temperature profiles are dependent on small changes in the percentage of the vapor fraction. The vapor fraction is introduced into distillation column 2 through the combined stream formed from first subsidiary stream 14 and vaporized liquid column bottom stream 20. As is evident from FIG. 2, a small change in the feed vapor fraction results in a significant shift in the temperature profile of the distillation column 2.

In order to keep product recovery high, distillation column 2 should be controlled so that the second temperature $T_2$ is high enough to drive up the product or lighter components of the feed. However, depending on the feed vapor fraction, such second temperature can change from −252° F. to −286° F. in the bottom section of the column, namely in separation stages 1-15. Such temperature change can be produced by a change of only about 2.86 percent of the vapor fraction in the feed. Compare $f_1$ and $f_8$. However, by the time the first temperature $T_1$ is sensed in the top section of the distillation column 2, temperatures in central and bottom sections of the columns may have increased to an extent that heavier components have vaporized and found their way into the product resulting in a purity upset condition in which the product purity has fallen below the purity specification. As a result, manipulation of reflux flow control valve 36 by the model predictive controller 4 solely by virtue of the first temperature $T_1$ sensed by temperature sensor 40 could be ineffective to prevent product stream 12 from going off specification. This is particularly true for high purity distillation columns.

As indicated above, model predictive controller 4 sends electrical signals control signals 38 and 39 to the valve controllers 3a and 3b to manipulate feed flow control valve 30 and reflux flow control valve 36. Model predictive controller 4 contains a model predictive control program that continually executes upon the elapse of a time period or a controller frequency. This controller frequency can be as little as one minute.

Figure 3:
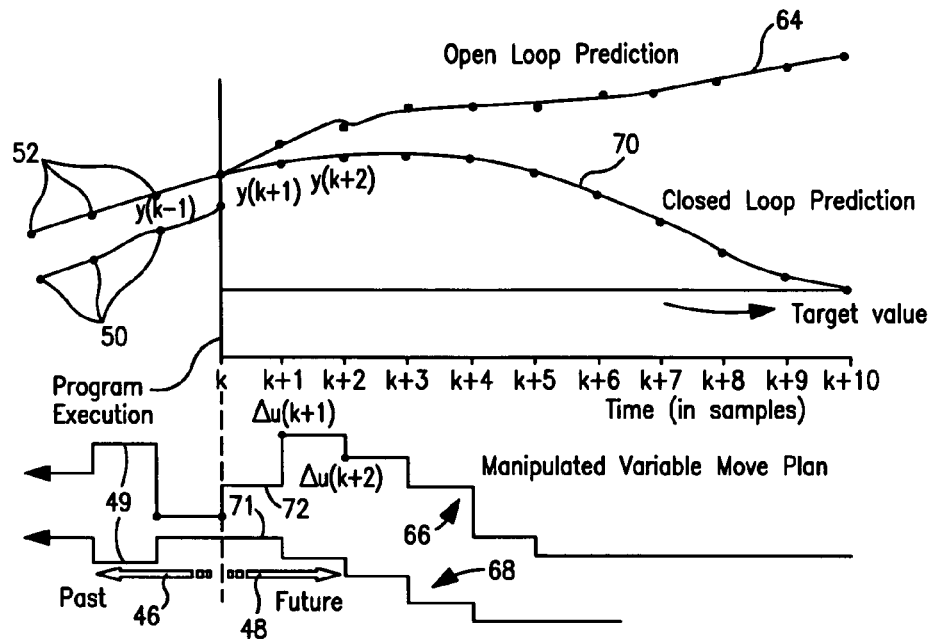
FIG. 3 is a graphical representation of the calculations that are necessary to obtain a movement plan of distillation columns such as shown in FIG. 2.

With additional reference to FIG. 3, a graphical representation of the events occurring in the model predictive control program are illustrated. In this graphical representation, the vertical solid line labeled "Program Execution" is an ordinate at the time of program execution indicating the temperature to be controlled, for example $T_1$. The horizontal abscissa labeled "k+1", "k+2" and etc. represent time increments equal to the controller frequency. Below the solid line is a dashed line indicating controller moves or percent openings of valves ("ΔU").

The model predictive control program maintains a dataset that is continually updated upon execution of the program "Program Execution". The dataset contains records over a previous time period 46 "Past", that is equal to a prediction horizon 48 "Future". The dataset records valve positions 49 of, for example, feed flow control valve 30 and reflux flow control valve 36 at previous program executions or at "k−1" and etc. Corresponding to each of the positions of feed flow control valve 30 and reflux flow control valve 36, are predicted temperatures 50 and corresponding actual temperatures 52 for the first temperature $T_1$ are also recorded. Similar sets of predicted and actual temperatures for $T_2$ would be stored for both feed flow control valve 30 and reflux flow control valve 36. The difference between the predicted and actual temperatures 50 and 52 are summed to produce a prediction error that would be discussed hereinafter.

Figure 4:
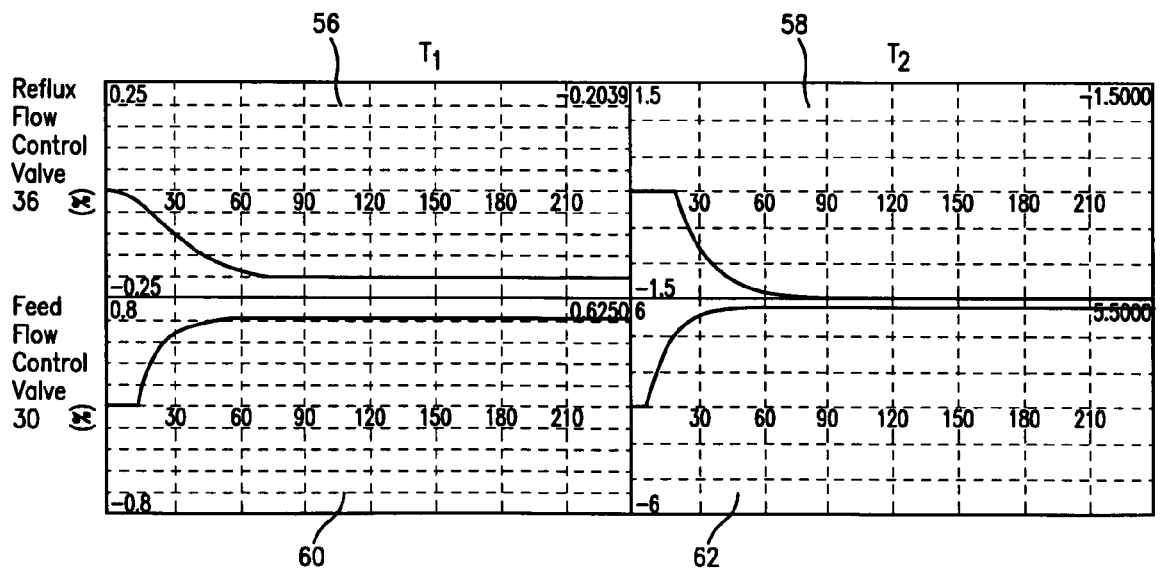
FIG. 4 is a step response model of the prior art that could be utilized by a model predictive control system utilized in controlling a distillation column illustrated in FIG. 1.

With reference to FIG. 4 step response models 56 and 58 are provided that relate the first manipulated variable of valve position of reflux flow control valve 36 to the first and second temperatures $T_1$ and $T_2$ that constitute first and second controlled variables. Step response models 56 and 58 indicate that as reflux flow control valve 36 is opened about one percent, first and second temperatures $T_1$ and $T_2$ decreases by 0.2039° F. and 1.5° F., respectively, to arrive at steady state, over the prediction horizon of about four hours. The prediction of any temperature versus valve position can be scaled. Similarly, the position of feed flow control valve 30 as a second manipulated variable is also considered with respect to step response models 60 and 62. A one percent increase in the percent opening of feed flow control valve 30 increases first temperature $T_1$ and second temperature $T_2$ by 0.6250° F. and 5.5° F, respectively, over the four hour prediction horizon. The prediction error, determined from the dataset as described above, is applied to both of the models to modify the models during each execution as a feed back control.

Returning again to FIG. 3, during the program execution, the actual first temperature $T_1$ is sensed and an open loop prediction 64 will be calculated. Open loop prediction 64 is simply the response of the controlled variable of first temperature $T_1$ computed on the basis that no further changes are made to valve positions. The program then computes a manipulated variable move plan 66 for reflux flow control valve 36 and a manipulated variable move plan 68 for feed flow control valve 30. These move plans consist of predicted moves for the first manipulated variable of movement of the reflux flow control valve 36 and the second manipulated variable of the motion of feed flow control valve 30. The move plans are optimized to produce close loop prediction 70 that is a curve illustrating the predicted movement of the first temperature $T_1$ in response to the move plans to allow such first temperature $T_1$ to reach a target value which in practice would be a range of values over the prediction horizon. Although not illustrated, a simultaneous action would be computations of prediction error, an open loop prediction and a closed loop prediction for the second controlled variable of the second temperature $T_2$ which would haven an effect on the move plans 66 and 68.

The first of the moves 72 and 74 is transmitted by model predictive controller 4 to valve controllers 3a and 3b that send control signals 76 and 78 to valve actuators 32 and 37 to appropriately set the position of feed flow control valve 30 and reflux flow control valve 36.

The foregoing description of the operation of a model predictive control system is one of conventional operation. However, as mentioned above, in distillation column 2, given its nonlinearity, simply controlling the position of reflux flow control valve 36 by way of actual first temperature $T_1$ will not necessarily be an effective method to control distillation column 2. Therefore, in accordance with the present invention, programmed within model predictive controller 4 is a threshold temperature at which the controller must act more aggressively. When the first temperature $T_1$ is at or below the threshold temperature, model predictive controller 4 simply makes computations of open and closed loop predictions based upon the measured actual temperature as outlined above. However, if the first temperature $T_1$, as actually measured, is above the threshold temperature, a transform temperature will be used in model predictive controller 4 to make the operation of model predictive controller 4 more aggressive under the circumstances. The transformed temperature is computed by adding to the threshold temperature a first tuning factor and a temperature difference divided by a second tuning factor. The temperature difference is obtained by subtracting from the current temperature, a temperature recorded at a previous execution time of the model predictive controller. Hence, the second tuning factor amplifies the effect of the temperature change.

Assuming that the temperature is increasing, the temperature increase will be magnified by the foregoing difference so that first temperature $T_1$ that is actually utilized in model predictive controller 4 is greater than that is actually sensed by temperature sensor 40. However, as the temperature turns or starts to decrease, more liquid column bottoms could be created to cause a level detector 44 to expel bottoms liquid that would result in a loss of potentially valuable product. Therefore, as the temperature decreases, the calculation of the transform temperature will create a lower temperature than that actually sensed by temperature sensor 40 to be utilized by model predictive controller 4. The first and second tuning constants are experimentally determined in order to give the appropriate response for a particular column. For example, a threshold value of 1.0 could be used initially and then appropriately tuned on-line in order to obtain the desired response in terms of speed. The second constant tuning parameter can be thought of as a "slope change exaggeration" parameter used to alter the temperature slope between consecutive execution times.

Although not illustrated, in case distillation column 2 is a high purity column, further measures could be taken to prevent a product purity specification upset. For example, intermediate temperatures between $T_1$ and $T_2$ and closer to the feed inlets 22 and 28 could be sensed and used to control feed flow control valve 30. Increases in such temperature could be utilized by model predictive controller 4 to turn down valve 30 so that less vapor and less heating occurred within distillation column 2. Control in such manner would prevent conditions from normally occurring in which aggressive control of reflux flow control valve were necessary.

The additional problem of distillation column system 2 concerns the tuning of model predictive control 4 under circumstances outlined above in which two or more manipulated variables each have an effect on two or more common controlled variables. Model predictive controller 4 typically will have several tuning constants such as move suppression for manipulated variables, steady state optimization cost parameter, equal concern error (or control weighting) for both steady state and dynamic situations. However, as each manipulated variable will have an effect on two controlled variables, it becomes a difficult and time consuming process to tune model predictive controller 4. For example, in tuning model predictive controller 4 programmed with step response models illustrated in FIG. 5, the following procedure would be used:

1) For reflux flow control valve 36 tuning, only select parameters required to control $T_1$ (note that the effect on $T_2$ is fed forward to the model prediction computation stage).
2) Similarly, for feed flow control valve 30, only select tuning parameters required to control only $T_2$ temperature and feed forward its impact on $T_1$.

In both instances "model decoupling" is applied so that the tuning is implemented as though one is dealing with a multi-loop system as opposed to a multivariable system.

Figure 5:
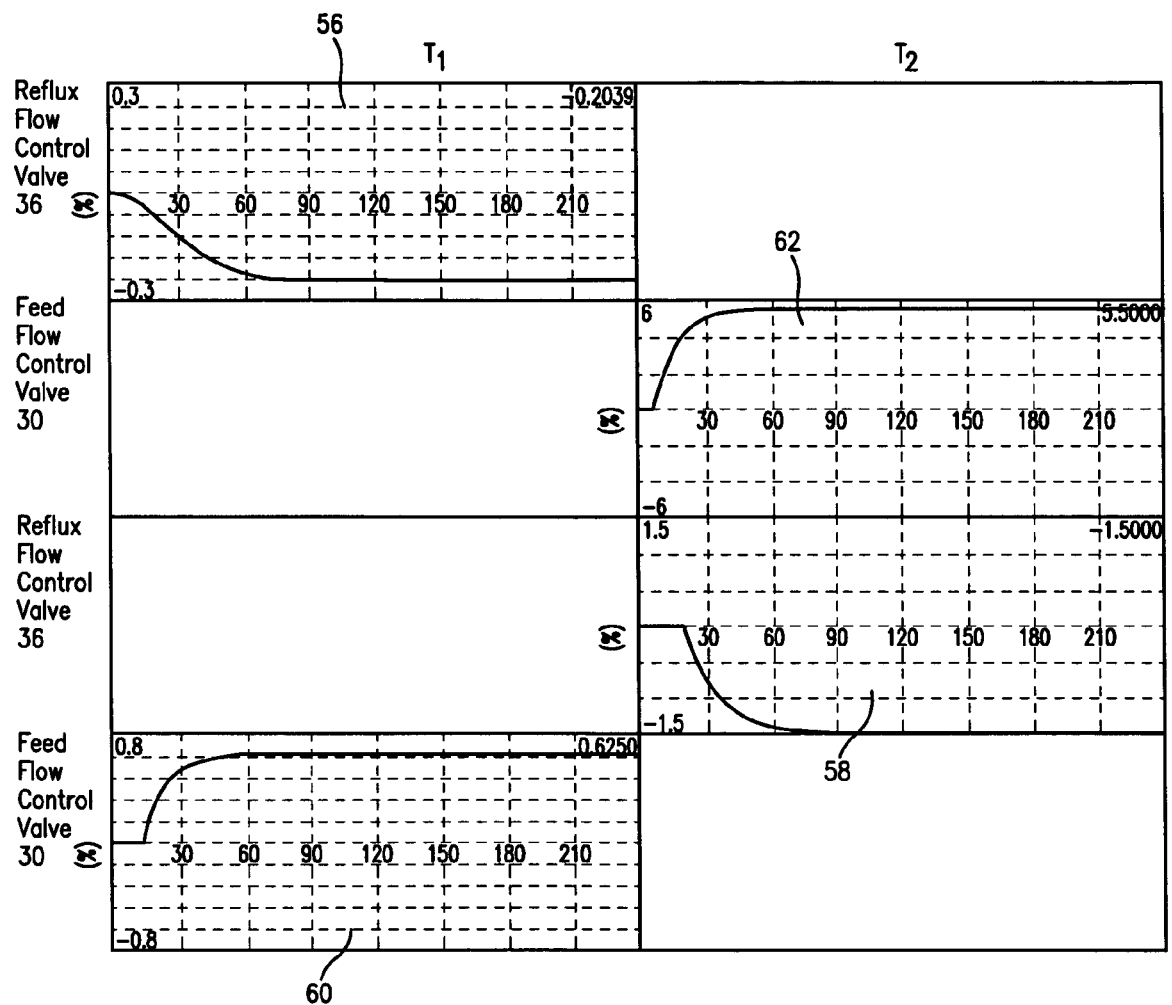
FIG. 5 is a graphical representation of a model used in controlling a distillation column in FIG. 1.

With reference to FIG. 5, it has been found to be advantageous to program model predictive controller 4 such that a single controlled variable is related to a single manipulated variable in terms of tuning. Thus, in accordance with a further aspect of the present invention, the effect of the second manipulated variable of valve position of feed flow control valve 30 on the first controlled variable of first temperature $T_1$ is utilized so that such second manipulated variable becomes a first feed forward variable in a calculation of the open and closed loop predictions of the first controlled variable of the first temperature $T_1$. As such, in the calculation of open and closed low predictions for the first controlled variable of the first temperature $T_1$, the step response model 56 is used conventionally, while the step response model 60 that relates the second manipulated variable to the first temperature $T_1$ is used so that such second manipulated variable of the position of feed flow control valve 30 is a first feed forward variable in such calculations. Similarly, step response model 62 is utilized conventionally and step response model 58 is used so that the position of the reflux flow control valve 36 is used as a feed forward variable.

Once programmed, as set forth above, the model predictive control program is functioning in a manner in which the adjustment of one valve controls one temperature while motion of the other valve, while having an effect on such temperature, is not simultaneously moved based on the other temperature predictions. The tuning of the controller programmed in such manner has been found to be much simpler than the conventional case as illustrated in FIG. 4. For example, in the conventional case, one has to decide what temperature to give up on when both temperatures are getting out of control range (since one manipulated variable can only control one controlled variable. Tuning parameters such as move suppressions and equal concern errors are easier to manipulate if the model form is decoupled via the introduction of feed forward variables as outlined above. This method of operation, whereby a feed forward variable is defined, can be used in any system in which two manipulated variables will effect two controlled variables that are in common. As can be appreciated, this could also be applied to complex systems having more manipulated variables and more controlled variables.

Figure 6:
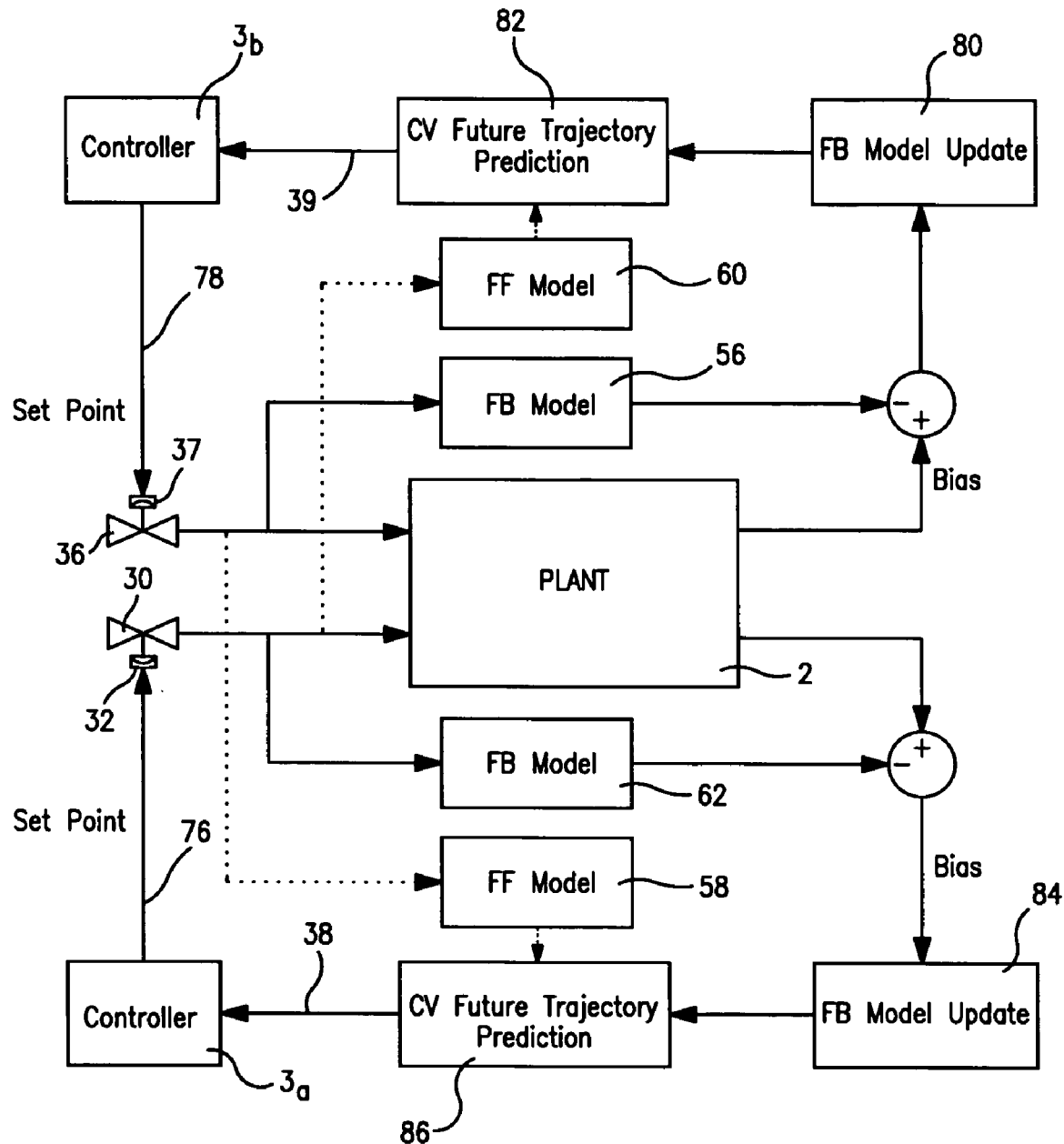
FIG. 6 is a graphical representation of the execution of a model predictive controller used in controlling the distillation column of FIG. 1 in accordance with the present invention.

With reference to FIG. 6, execution of model predictive controller 4 is illustrated utilizing the model of FIG. 5. Upon each execution of the program, the step response model 56 is updated with a prediction error determined at 80. At the same time, valve position of reflux flow control valve 36 is also known and the step response model 60, which serves as an input based upon the position of feed flow control valve 30, is used as a feed forward variable in the calculation of open and closed loop predictions at 82 in the block labeled "CV Future Trajectory Prediction". The first move of the computed move plan is then transmitted as an electrical signal 39 to valve controller 3b which in turn sends a control signal 78 to valve actuator 37.

Similarly with respect to the position of feed flow control valve 30, the step response model 62 is updated at 84 with a prediction error. The position of reflux flow control valve 38 and the step response model 58 serves as an input so that the position of reflux flow control valve 38 is a feed forward variable to produce the open and closed loop predictions for the second controlled variable of the second temperature $T_2$ that are computed at 86. The move plan is computed and the first of the moves serves is transmitted by way of an electrical signal 38 as an input to controller 3a to manipulate feed flow control valve 30 through action of valve actuator 32 controlled by control signal 76.

While the present invention has been described with reference to a preferred embodiment, as will occur to those skilled in the art numerous changes, omissions and additions can be made without departing from the spirit and the scope of the present invention.

We claim:

1. A method of controlling a distillation column having control valves including a reflux flow control valve to manipulate reflux flow rate to a top section of the column and at least one inlet for a feed to be separated situated below a reflux inlet for the reflux flow, the feed having a varying temperature that could potentially affect a first temperature within the top section of the distillation column upon an increase in feed temperature and a varying composition that also could potentially affect the first temperature upon an increase of less volatile components within the feed, said method comprising;

repeatedly executing a model predictive controller at a controller frequency;
the model predictive controller having a dataset, containing records over a previous time period equal to a prediction horizon that includes valve positions of the control valves, including the reflux flow control valve, as manipulated variables and corresponding actual values of sensed temperatures, including the first temperature, as controlled variables and predicted values for the controlled variables, the model predictive controller also being programmed with step response models relating the manipulated variables to the controlled variables;

during each execution of the model predictive controller, updating the dataset with the actual current values of the manipulated variables, utilizing the dataset and the step response models to calculate prediction errors, applying the prediction errors to predictions as an off-set, calculating open and closed loop predictions over the prediction horizon and obtaining a set of move plans for movements of the manipulated variables to minimize the difference between the controlled variables and target values related to the controlled variables, and generating signals referable to initial movements contained in the set of move plans; and transmitting the signals to controllers used in setting the control valves, thereby to implement the initial movements of the control valves;

a first of the controlled variables being referable to the first temperature and having a value that is equal to the first temperature, when said first temperature is below a threshold temperature and a transformed value, when said first temperature is above the threshold temperature, the transformed value being calculated from a sum of said threshold temperature, a first tuning factor and a temperature change divided by a second tuning factor used to amplify an effect of the temperature change, the temperature change being computed by subtracting from current first temperature, the first temperature sensed during a previous execution of the model predictive control program.

2. The method of claim 1, wherein:

a second of the controlled variables is a second temperature sensed at a bottom section of the column;

the feed is liquid and is in part vaporized to form a two-phase feed consisting of a vaporized fraction and a liquid fraction of the feed and a vaporized column bottoms stream, made up of liquid column bottoms, is combined with at least vaporized fraction of the feed prior to introduction of the feed into the distillation column and the at least one inlet for the feed is at a column height situated between the top section and the bottom section of the distillation column;

the control valves also include a feed flow control valve as a second manipulated variable to simultaneously control flow rates of the vapor and liquid fractions such that an increase in the flow rate of the vapor fraction results in a corresponding decrease in the flow rate of the liquid fraction and increases the first temperature and the second temperature and vice-versa and an increase in the flow rate liquid fraction decreases the first temperature and the second temperature and vice-versa; and the step response models include a first step response model and a second step response model relating the first of the manipulated variable to the first and second of the controlled variables and a third step response model and a fourth step response models relating the second manipulated variable to the first and second controlled variables, respectively.

3. The method of claim 2, wherein:

said at least one inlet is two separate inlets;

the vapor fraction and the liquid fraction of the feed are separately introduced into the distillation column through the two separate inlets;

said feed is divided into first and second subsidiary streams, the first of the subsidiary streams is vaporized and combined with the vaporized liquid column bottom stream to form a vapor fraction stream;

the vapor fraction stream is introduced into one of the two separate inlets to introduce the vapor fraction into the distillation column; and the second subsidiary stream is introduced into the other of the two separate inlets to introduce the liquid fraction into the distillation column.

4. The method of claim 2 or claim 3, wherein the open and closed loop predictions are calculated for the first of the controlled variables and the first of the manipulated variables through superposition of the first step response model and the third step response model and with the second manipulated variable being used in connection with the third step response model as a first feed forward variable and the open and closed loop predictions being calculated for the second controlled variable through superposition of the forth step response model and the second step response model and with the first manipulated variable being used in connection with the second step response model as a second feed forward variable.

5. A method of controlling a system having manipulated variables to control process parameters of the system in response to deviations of the process parameters from target values related thereto:

repeatedly executing a model predictive controller at a controller frequency;

the model predictive controller having a dataset, containing records over a previous time period equal to a prediction horizon of states of the controls as manipulated variables and corresponding actual values of the process parameters as controlled variables and predicted values for the controlled variables, the model predictive controller also being programmed with step response models relating the manipulated variables controlled variables;

during each execution of the model predictive controller, updating the dataset with actual current values of the manipulated variables, utilizing the dataset and the step response models to calculate prediction errors, applying the prediction errors to predictions as an off-set and calculating open and closed loop predictions over the prediction horizon and obtaining a set of move plans for movements of the manipulated variables to minimize the difference between the controlled variables and target values related to the controlled variables, and generating signals referable to initial movements contained in the set of move plans;

the controlled variables including first and second controlled variables, the manipulated variables including a first manipulated variable having an effect on the first and second controlled variables and a second manipulated variable also having an effect on the first and second controlled variables and the step response models including first and second step response models relating the first manipulated variable to the first and second controlled variables, respectively, and third and forth step response models relating the second manipulated variable to the first and second controlled variables, respectively;

the open and closed loop predictions being calculated for the first controlled variable and the first manipulated variable through superposition of the first step response model and the third step response model and with the second manipulated variable being used in connection with the third step response model as a first feed forward variable and the open and closed loop predictions being calculated for the second controlled variable through superposition of the forth step response model and the second step response model and with the first manipulated variable being used in connection with the second step response model as a second feed forward variable; and transmitting the signals to controllers used in setting the first and second of the controls to implement the initial movements of the first and second of the controls.

6. The method of claim 5, wherein:

the system is a distillation column;

the first of the controlled variables is a first temperature sensed at the top section of the column;

the second of the controlled variables is a second temperature sensed at the bottom section of the column;

the first of the controls is a first flow control valve to control reflux flow rate to a top section of the column and such that an increase in the reflux flow read decreases both the first temperature and the second temperature and vice-versa;

vapor and liquid fractions of a feed to be distilled within the column enter the distillation column at column height situated between the top section and bottom section of the distillation column, the feed being a liquid that is in part vaporized to form the vapor fraction and a vaporized column bottoms stream, made up of liquid column bottoms, is combined with at least the vapor fraction of the feed prior to its introduction into the distillation column; and the second of the controls is a feed flow control valve to simultaneously control flow rates of the vapor and liquid fraction such that an increase in the flow rate of the vapor fraction decreases the flow rate of the liquid fraction;

an increase in the flow rate of the vapor fraction increases the first temperature and the second temperature and vice-versa.

7. The method of claim 6, wherein:

the vapor fraction and the liquid fraction of the feed are separately introduced into the distillation column through the two separate inlets;

said feed is divided into first and second subsidiary streams, the first of the subsidiary streams is vaporized and combined with the vaporized liquid column bottom stream to form a vapor fraction stream;

the vapor traction stream is introduced into one of the two separate inlets to introduce the vapor fraction into the distillation column; and the second subsidiary stream is introduced into the other of the two separate inlets to introduce the liquid fraction into the distillation column.

* * * * *

UNITED STATES PATENT AND TRADEMARK OFFICE
CERTIFICATE OF CORRECTION

PATENT NO. : 7,292,899 B2  
APPLICATION NO. : 11/203140  
DATED : November 6, 2007  
INVENTOR(S) : Dadebo et al.

Page 1 of 1

It is certified that error appears in the above-identified patent and that said Letters Patent is hereby corrected as shown below:

Col. 12, claim 4, line 22, replace "forth" with --fourth--.

Col. 12, claim 5, line 63, replace "forth" with --fourth--.

Col. 13, claim 5, line 7, replace "forth" with --fourth--.

Signed and Sealed this

Twenty-ninth Day of April, 2008

JON W. DUDAS  
*Director of the United States Patent and Trademark Office*